(12) United States Patent
Cardenas et al.

(10) Patent No.: US 6,966,746 B2
(45) Date of Patent: Nov. 22, 2005

(54) BEARING PRESSURE BALANCE APPARATUS

(75) Inventors: Alfredo Cardenas, Hermosa Beach, CA (US); Wilfred G. McKelvey, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 26 days.

(21) Appl. No.: 10/728,632

(22) Filed: Dec. 5, 2003

(65) Prior Publication Data

US 2004/0119239 A1 Jun. 24, 2004

Related U.S. Application Data

(60) Provisional application No. 60/435,327, filed on Dec. 19, 2002.

(51) Int. Cl.[7] .............................................. F01D 25/16
(52) U.S. Cl. ........................... 415/1; 415/111; 416/174
(58) Field of Search ........................... 415/1, 215, 206, 415/111, 112, 174.5, 230, 215.1; 416/174, 416/203

(56) References Cited

U.S. PATENT DOCUMENTS

| | | | |
|---|---|---|---|
| 3,547,606 A * | 12/1970 | Swearingen | 436/148 |
| 3,671,137 A * | 6/1972 | Ball | 415/104 |
| 3,728,857 A * | 4/1973 | Nichols | 415/1 |
| 3,828,610 A * | 8/1974 | Swearingen | 415/104 |
| 3,895,689 A * | 7/1975 | Swearingen | 415/104 |
| 3,898,793 A * | 8/1975 | Nakamura et al. | 415/112 |
| 4,385,768 A * | 5/1983 | Swearingen | 415/34 |
| 4,472,107 A * | 9/1984 | Chang et al. | 415/104 |
| 4,613,288 A * | 9/1986 | McInerney | 417/407 |
| 4,716,648 A | 1/1988 | Nel | |
| 4,834,693 A * | 5/1989 | Profant et al. | 464/183 |
| 4,997,340 A | 3/1991 | Zinsmeyer et al. | |
| 5,927,720 A | 7/1999 | Zinsmeyer et al. | |
| 6,114,784 A | 9/2000 | Nakano | |
| 6,355,995 B1 | 3/2002 | Jeppesen | |
| 6,368,077 B1 * | 4/2002 | Meyerkord et al. | 415/170.1 |
| 6,599,020 B2 * | 7/2003 | Obara | 384/480 |

* cited by examiner

Primary Examiner—Edward K. Look
Assistant Examiner—Igor Kershteyn
(74) Attorney, Agent, or Firm—Oval Caglav, Esq.

(57) ABSTRACT

The present invention provides a method and apparatus for balancing the pressure across a front bearing in a compressor housing. The present invention may protect the bearing from lubricant migration by eliminating pressure differentials across the bearing. When a blower or fan is running, the bearing experiences the same pressure differential that is across the blower. Unless this pressure is balanced, lubricant may migrate from the bearing very quickly. The present invention may provide a pressure balance and sealing across the front bearing of a blower or fan. A plurality of grooves on the face of a compressor impeller and a plurality of grooves on a compressor shaft surface restrict the gas flow to balance pressure across a bearing. Alternatively, a labyrinth seal may cooperate with a plurality of grooves on the face of a compressor impeller to balance pressure across the bearing.

32 Claims, 3 Drawing Sheets

BEARING PRESSURE BALANCE APPARATUS

CROSS-REFERENCE TO RELATED APPLICATIONS

This application claims the benefit of U.S. Provisional Patent Application No. 60/435,327, filed on Dec. 19, 2002.

BACKGROUND OF THE INVENTION

The present invention relates generally to centrifugal compressors and, more specifically, to a method and apparatus for balancing a pressure differential across a bearing.

Turbines may use the exhaust gasses discharged from internal combustion engines as a motive gas to rotate a turbine wheel that may be mounted on one end of a shaft. An impeller may be mounted on the other end of the shaft, and is turned by the turbine wheel to compress gas, which then may be communicated to the engine, thereby supplying charge gas to the engine for increasing engine performance. To improve operating efficiency and to extend range or operation, it may be desirable to control the flow of gasses and control pressure drop across a bearing.

Aircraft, spacecraft, military vehicles, and other vehicles depend upon auxiliary systems, such as pneumatic equipment for pressurizing tanks, transferring fuel (e.g., refueling operations), generating vacuum (e.g., sanitation systems), and other processes. The bearings in a compressor apparatus require sufficient lubrication for smooth operation and longer bearing life. The volumetric gas flow passing through a centrifugal compressor creates a pressure differential across the compressor apparatus that may cause a pressure drop across the bearings, causing lubricant to leak from the bearing and premature bearing failure.

To counteract the aerodynamic pressure differential developed by the centrifugal compressor impeller a fluid channel may be used on the downstream side of the impeller. Leaking lubricant may leak into the fluid channel. Labyrinth seals have been used to attempt to prevent leaking oil from leaving the bearing housing. However, these labyrinth seals have needed to be pressurized and intricate in design to be effective. Pressurizing the labyrinth seal requires additional hardware and design changes to account for diverted gas flow and power requirements.

As can be seen, there is a need for an improved apparatus and method for controlling the leakage of bearing lubricant to provide for longer bearing life without excessive expense or extensive additional hardware.

SUMMARY OF THE INVENTION

In one aspect of the present invention, an apparatus for balancing a pressure differential across a bearing comprises an impeller on a shaft; the impeller having an upstream side and a downstream side; a bearing housing on the downstream side of the impeller; the bearing housing having an upstream side and a downstream side; and a plurality of annular grooves on the impeller; the plurality of annular grooves concentrically situated in relation to the shaft.

In an alternative aspect of the present invention, an apparatus for balancing a pressure differential across a bearing comprises an impeller on a shaft; the impeller having an upstream side and a downstream side; a bearing housing on the downstream side of the impeller; a plurality of annular grooves on the downstream side of the impeller; the plurality of annular grooves concentrically situated in relation to the shaft the shaft having a cylindrical outer surface; and a plurality of grooves on the shaft.

In another aspect of the present invention, an apparatus for balancing a pressure differential across a bearing comprises an impeller on a shaft; the impeller having an upstream side and a downstream side; a bearing housing on the downstream side of the impeller; a plurality of annular grooves on the downstream side of the impeller; the plurality of annular grooves concentrically situated in relation to the shaft; and a labyrinth seal situated downstream from the bearing housing; the labyrinth seal including a plurality of discs.

In yet another aspect of the present invention, a die cast aluminum compressor housing comprises an impeller on a shaft; the shaft within a bore in a compressor housing; the impeller having an upstream side and a downstream side; a bearing housing on the downstream side of the impeller; a plurality of annular grooves on the downstream side of the impeller; the plurality of annular grooves concentrically situated in relation to the shaft; the shaft having a cylindrical outer surface; and a plurality of grooves on the cylindrical outer surface of the shaft.

In a further aspect of the present invention, a method of balancing pressure within a compressor housing comprises providing annular grooves on an impeller; using a shaft to rotate the impeller; positioning a bearing housing around the outer circumference of the shaft and downstream from the impeller; and counteracting a pressure differential across the bearing housing.

In a still further aspect of the present invention, a method of balancing pressure within a compressor housing comprises providing annular grooves on an impeller; using a shaft to rotate the impeller; positioning a bearing housing around the outer circumference of the shaft and downstream from the impeller; positioning a labyrinth seal downstream from the bearing housing; and counteracting a pressure differential across the bearing housing.

In a yet further aspect of the present invention, a method of compressing a gas without causing bearing lubricant leak, comprises flowing a gas into a compressor housing; applying aerodynamic resistance to the gas; directing the gas through and around a bearing; and directing the gas across an outer surface of a shaft.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention is useful for aircraft, spacecraft, military vehicles, and other vehicles. Specifically, the invention is useful for auxiliary systems, such as pneumatic equipment for pressurizing tanks, transferring fuel (e.g., refueling operations), generating vacuum (e.g., sanitation systems), and other processes. The invention is also useful for turbochargers. For illustrative purposes, the following description is of a compressor housing, however, it is to be understood that other applications can be substituted for the compressor housing.

The present invention may protect the bearing from lubricant migration by eliminating pressure differentials across the bearing. When a blower or fan is running, or when non-operational in an environment with a pressure differential across the blower, the bearing experiences the same pressure differential that is across the blower. Unless this pressure is balanced, lubricant may migrate from the bearing very quickly. This may reduce the life of the bearing significantly. The present invention may provide a pressure balance and sealing across the front bearing of a blower, fan, or compressor. The present invention may also reduce the effect of pressure variations on the bearing during high cycle operation. This may be achieved regardless of whether the blower is on or off.

Figure 1:
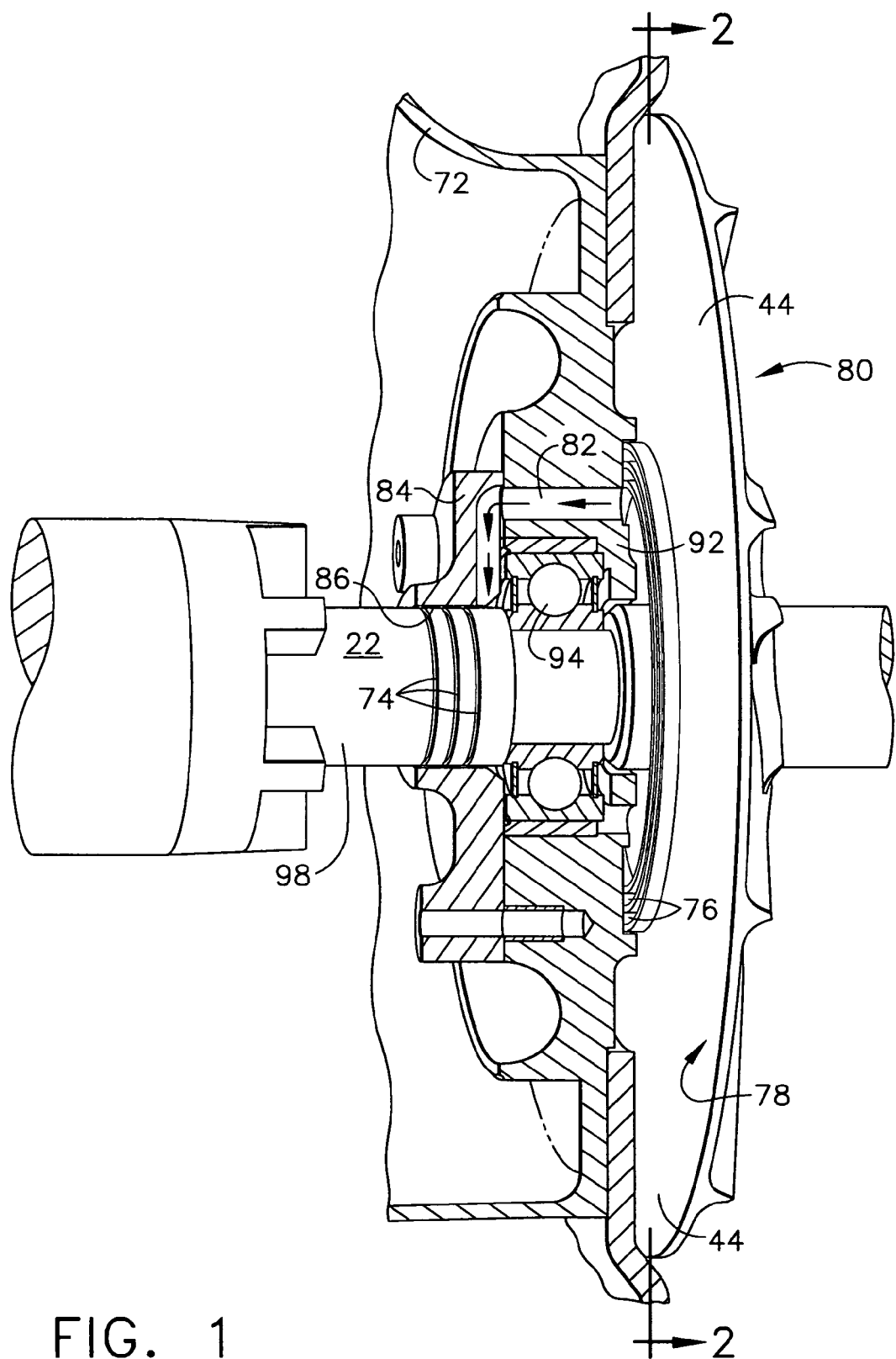
FIG. 1 is a partial cross-sectional view of an apparatus for balancing pressure across a bearing housing, according to an embodiment of the present invention.

The interior of a compressor, a blower or fan housing 72 is shown in detail in FIG. 1. The housing 72 may be composed of die cast aluminum or any other suitable material. The impeller 44 may be made of aluminum or any other suitable material. The impeller 44 is installed on a shaft 22, which may also be made of aluminum, or any other suitable material. The impeller 44 may have a downstream side 78 and an upstream side 80. A bearing housing 92, houses a lubricated bearing 94, which may be mounted around a cylindrical outer surface 98 of the shaft 22. The position of the bearing housing 92 may be adjacent to the downstream side 78 of the impeller 44.

A plurality of annular grooves 76 may be located on the downstream side 78 of the impeller 44. The annular grooves 76 may be concentrically situated in relation to the shaft 22. Optionally, a plurality of grooves 74 may be located on the cylindrical outer surface 98 of the shaft 22. A fluid channel housing 84 may be situated downstream from the bearing housing 92. The base 86 of the fluid channel housing 84 may be situated just above the outer surface 98 of the shaft 22. A fluid channel 82 may travel through the fluid channel housing 84 for transport of fluid, including gas. The fluid channel 82 may serve as an air pressure path across the bearings 94. A gas, such as air, may flow over the plurality of annular grooves 76 located on the downstream side 78 of the impeller 44, into and through the fluid channel 82, onto the outer surface 98 of the shaft 22, past the base 86 and over the plurality of annular grooves 76 on the outer surface 98 of the shaft 22. The travel of the air flow over the plurality of annular grooves 76 may slow the air flow and resist a pressure rise. In continuous operation or constant pressure differential environments, the pressure across the plurality of annular grooves 76 may eventually become equal, creating a pressure differential across the bearings 94. Air may then move through the fluid channel 82. Next, air may then move across the plurality of grooves 74 in the shaft 22. The air flow across the grooves 74 may be impeded, such that air flow is prevented from moving past the grooves 74 and the base 86 of the fluid channel housing 84. This may raise the pressure of the air flow until the pressure on the downstream side of the bearing housing 92 is equal to the pressure on the upstream side of the bearing housing 92, creating a "pressure balance." This pressure balance may be created instantly because the pressure is balanced across the plurality of annular grooves 76 on the downstream 78 side of the impeller 44.

The series of grooves 76 is important for minimizing the effect of fast-acting pressure differentials, during start-up of the impeller 44, and other abrupt changes in pressure conditions, across the bearing housing 92, including the bearings 94. The series of grooves 76 also may prevent liquid penetration of the bearing housing 92 in wet environment applications. The series of grooves 76 may be more easily observed in FIG. 2, which shows the shaft 22 and the impeller 44 from the downstream side 78 of the impeller 44, across line 3—3 in FIG. 1. The plurality of annular grooves 76, for example, from about 2 to about 5 annular grooves 76, preferably three annular grooves 76, may be concentric with the shaft 22 and situated near the outer surface 98 of the shaft 22.

Figure 3:
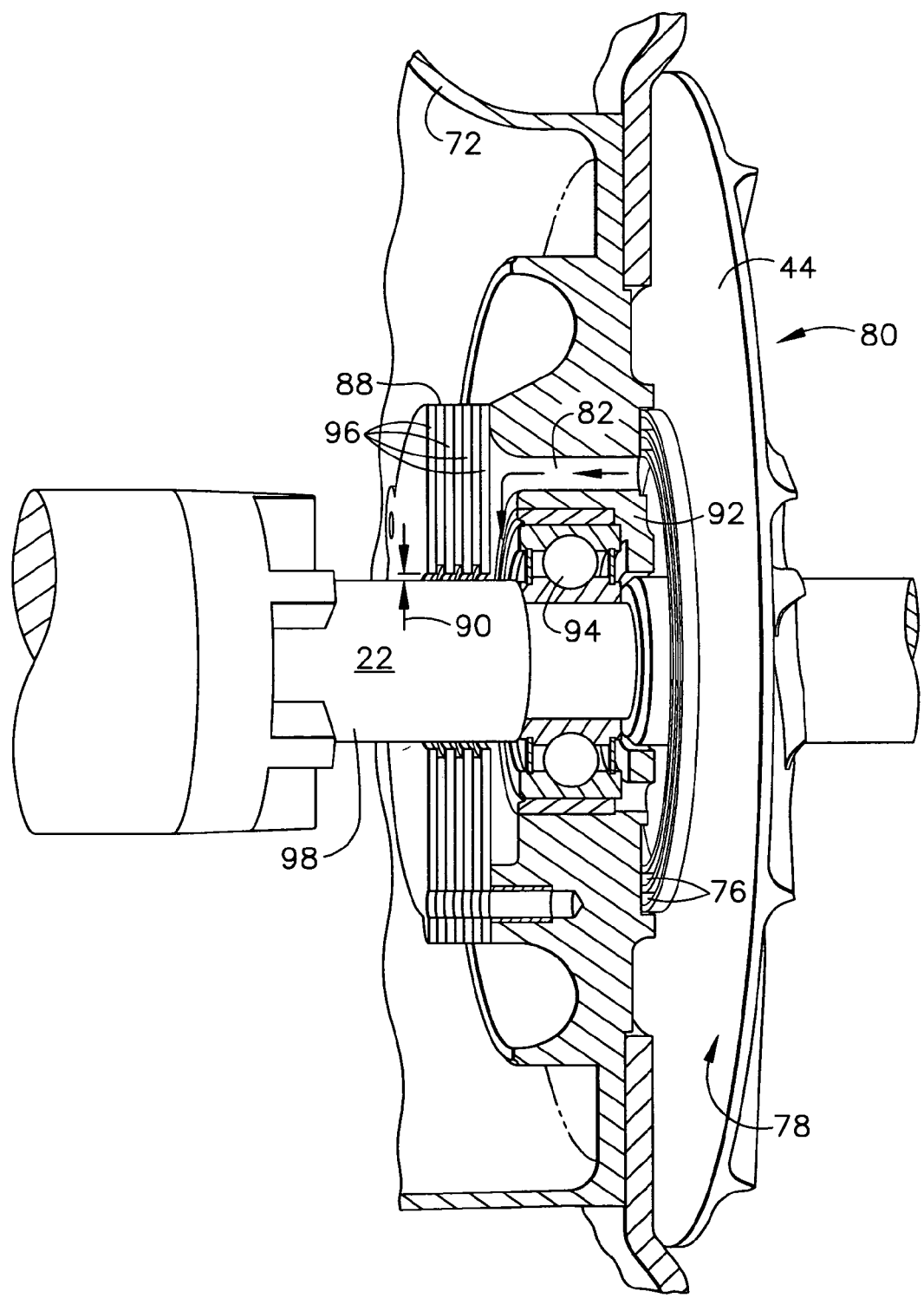
FIG. 3 is a partial cross-sectional view of an apparatus for balancing pressure across a bearing housing, according to an alternate embodiment of the present invention.

An alternative embodiment is shown in FIG. 3. The equipment is similar to that shown in FIG. 1, as explained previously, except a labyrinth seal 88 is used in place of the grooves 74 in the shaft 22 and the fluid channel housing 84. A fluid channel 82 may be situated adjacent and downstream from the bearing housing 92 and upstream of the labyrinth seal 88. The labyrinth seal 88 may not touch the outer surface 98 of the shaft 22, but the labyrinth seal 88 may be situated in close relation to the outer surface 98 of the shaft 22, such that a seal gap 90 exists between the outer surface 98 of the shaft 22 and the labyrinth seal 88. The pressure balance effect operates similarly as in the embodiment shown in FIG. 1, in that the air flow across the plurality of grooves 76 in the impeller 44 is pressure balanced and the air flow traveling through the seal gap 90 and across the labyrinth seal 88 operates to balance the pressure across the bearing housing 92 to minimize lubricant leakage.

The labyrinth seal 88 may be constructed of a series of discs 96, for example, from about 2 to about 6 discs 96, preferably about four discs 96. The series of discs 96 may consist of two or more holes of different inner diameters, such that when the holes are placed together, cavities may be created between the discs 96. The discs 96 may be made from any suitable material, for example, aluminum.

Referring back to FIG. 1, a method of balancing pressure within compressor housing 72 may include providing the annular grooves 76 on the impeller 44. The plurality of annular grooves 76 may be situated on the downstream side 78 of the impeller 44. Next, the method may include using the shaft 22 to rotate the impeller 44. The shaft 22 may have a plurality of grooves 76 on the outer surface 98. The method may continue with positioning the bearing housing 92 around the outer circumference 98 of the shaft 22 and downstream from the impeller 44. In addition, a method may include counteracting a pressure differential across the bearing housing 92.

Referring now to FIG. 3, a method of balancing pressure within the compressor housing 72 may include providing annular grooves 76 on the impeller 44. The plurality of annular grooves 76 may be situated on the downstream side 78 of the impeller 44. Next, the method may include using the shaft 22 to rotate the impeller 44. The method may continue with positioning the bearing housing 92 around the outer circumference 98 of the shaft 22 and downstream from the impeller 44. The method may continue with positioning the labyrinth seal 88 downstream from the bearing housing 92. The labyrinth seal 88 may include the plurality of discs 96, perhaps four discs 96. In addition, a method may include counteracting a pressure differential across the bearing housing 92.

Figure 2:
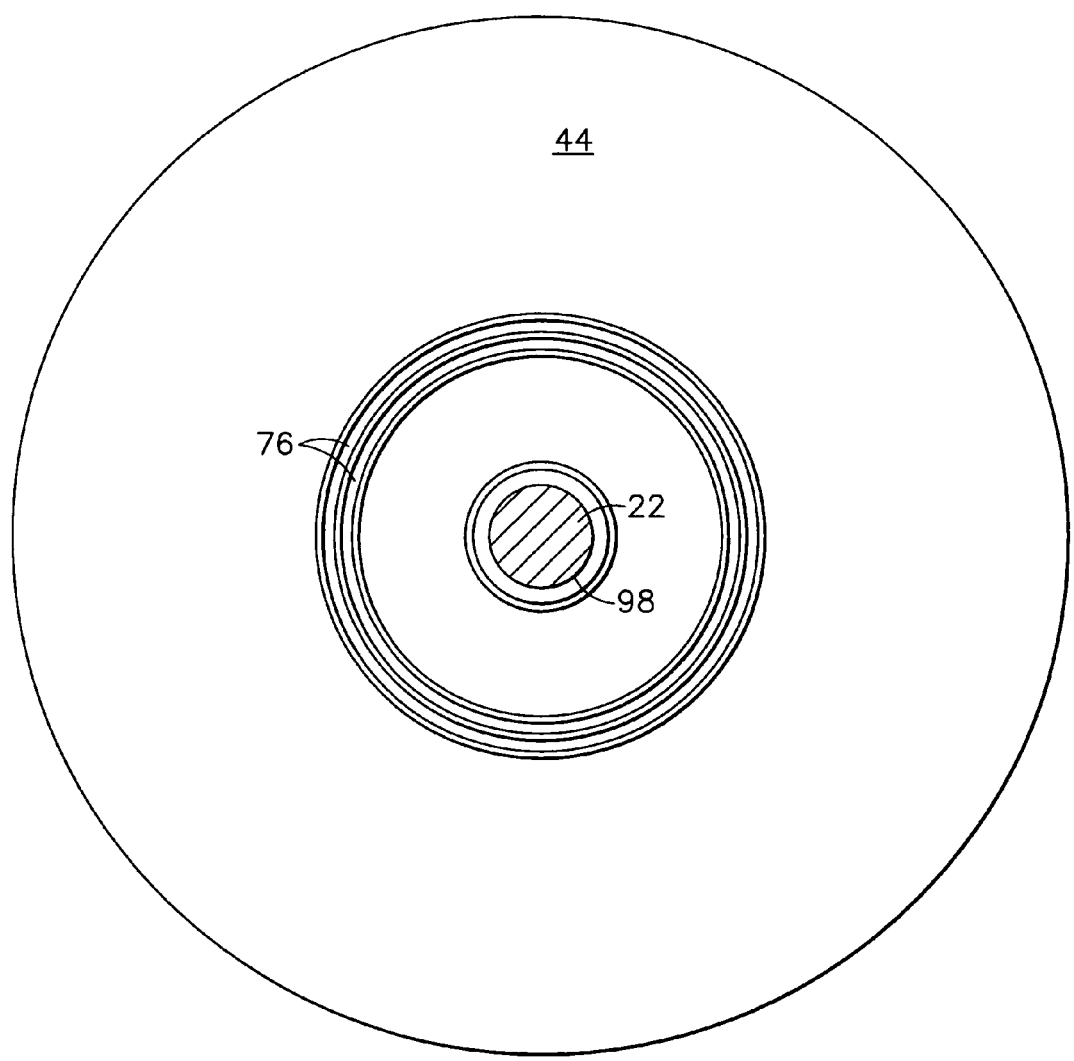
FIG. 2 is a view of the downstream side of the impeller and shaft from FIG. 1, seen along line 3—3, according to an embodiment of the present invention.

Continuing with FIGS. 2 and 4, a method of compressing a gas without causing bearing lubricant leak may include flowing a gas into the compressor housing 72. Aerodynamic resistance (such as from the annular grooves 76 or any other structure that may create aerodynamic resistance to the gas) may be applied to the gas. The gas may be directed through and around the bearing 94 and the bearing housing 92. Next, the gas may be directed across the outer surface 98 of the shaft 22. Optionally, the gas directed across the outer surface 98 of the shaft 22 may be also directed adjacent to the labyrinth seal 88. Another step may include applying aerodynamic resistance to the gas (for example, with the plurality of grooves 74 in the shaft 22).

Although the present invention has been described in considerable detail with reference to certain preferred versions thereof, other versions are possible. Therefore, the spirit and scope of the appended claims should not be limited to the description of the preferred versions contained therein.

We claim:

1. An apparatus for balancing a pressure differential across a bearing, comprising:
    an impeller for producing a high pressure in a fluid, said impeller being mounted on a shaft;
    the impeller having an upstream side and a downstream side;
    a bearing housing on the downstream side of the impeller;
    the bearing housing having an upstream side and a downstream side; and
    a plurality of annular grooves on the downstream side of the impeller;
    the plurality of annular grooves concentrically situated in relation to the shaft to control a flow of the high pressure fluid across the downstream side of the impeller.

2. The apparatus of claim 1, wherein the shaft has a plurality of grooves on the shaft surface, the grooves being axially situated in relation to the shaft to control a flow of the high pressure fluid in a downstream direction.

3. The apparatus of claim 1, wherein a labyrinth seal is situated on the downstream side of the bearing housing with a seal gap that controls flow of the high pressure fluid in a downstream direction.

4. An apparatus for balancing a pressure differential across a bearing, comprising:
    an impeller on a shaft;
    the impeller having an upstream side and a downstream side;
    a bearing housing on the downstream side of the impeller;
    a plurality of annular grooves on the downstream side of the impeller;
    the plurality of annular grooves concentrically situated in relation to the shaft;
    the shaft having a cylindrical outer surface; and
    a plurality of grooves on the shaft;
    a fluid channel housing situated downstream from the bearing housing; and
    a fluid channel traveling through the fluid channel housing.

5. The apparatus of claim 4, wherein a base of the fluid channel housing is situated just above the outer surface of the shaft.

6. The apparatus of claim 4 wherein the plurality of grooves on the shaft are axially situated in relation to the shaft.

7. The apparatus of claim 6 wherein the plurality of grooves on the shaft comprises three grooves.

8. The apparatus of claim 6 wherein the plurality of annular grooves on the downstream side of the impeller comprises three grooves.

9. An apparatus for balancing a pressure differential across a bearing, comprising:
    an impeller on a shaft;
    the impeller having an upstream side and a downstream side;
    a bearing housing on the downstream side of the impeller;
    a plurality of annular grooves on the downstream side of the impeller;
    the plurality of annular grooves concentrically situated in relation to the shaft; and
    a labyrinth seal situated downstream from the bearing housing;
    the labyrinth seal being positioned around the shaft with a seal gap adjacent the shaft, the gap being sufficient in size to permit flow of pressure balancing fluid therethrough.

10. The apparatus of claim 9, wherein the labyrinth seal includes a plurality of discs.

11. The apparatus of claim 9, wherein the plurality of annular grooves on the downstream side of the impeller comprises three grooves.

12. The apparatus of claim 9, wherein the shaft comprises aluminum.

13. The apparatus of claim 9, wherein the impeller comprises aluminum.

14. An apparatus for balancing a pressure differential across a bearing, comprising:
    an impeller on a shaft;
    the impeller having an upstream side and a downstream side;
    a bearing housing on the downstream side of the impeller;
    a plurality of annular grooves on the downstream side of the impeller;
    the plurality of annular grooves concentrically situated in relation to the shaft; and
    a labyrinth seal situated downstream from the bearing housing;
    the labyrinth seal including a plurality of discs
    a fluid channel housing situated downstream from the bearing housing; and
    a fluid channel traveling through the fluid channel housing.

15. The apparatus of claim 14, wherein a base of the fluid channel housing is situated just above the outer surface of the shaft.

16. The apparatus of claim 14 wherein the labyrinth seal is positioned around the shaft with a seal gap adjacent the shaft, the gap being sufficient in size to permit flow of pressure balancing fluid therethrough.

17. The apparatus of claim 16 wherein the labyrinth seal includes a plurality of discs.

18. The apparatus of claim 16 wherein the plurality of annular grooves on the downstream side of the impeller comprises three grooves.

19. The apparatus of claim 16 wherein the shaft comprises aluminum.

20. The apparatus of claim 16 wherein the impeller comprises aluminum.

21. A die cast aluminum compressor housing, comprising:
    an impeller on a shaft; the shaft within a bore in a compressor housing;

the impeller having an upstream side and a downstream side;

a bearing housing on the downstream side of the impeller;

a plurality of annular grooves on the downstream side of the impeller;

the plurality of annular grooves concentrically situated in relation to the shaft;

the shaft having a cylindrical outer surface;

a plurality of grooves on the cylindrical outer surface of the shaft;

a fluid channel housing situated downstream from the bearing housing; and a fluid channel traveling through the fluid channel housing.

22. The apparatus of claim 21, wherein a base of the fluid channel housing is situated just above the outer surface of the shaft.

23. The die cast aluminum compressor housing of claim 21, wherein the plurality of annular grooves on the downstream side of the impeller comprises three grooves.

24. The die cast aluminum compressor housing of claim 21, wherein the shaft comprises aluminum.

25. The apparatus of claim 21, wherein the plurality of grooves on the cylindrical outer surface of the shaft comprises three grooves.

26. A method of balancing pressure within a compressor housing, comprising:

providing annular grooves on an impeller on a downstream side of the impeller to produce aerodynamic resistance to a flow of a compressed gas;

rotating the impeller with a shaft;

positioning a bearing housing around the outer circumference of the shaft and downstream from the impeller; and directing the aerodynamically resisted flow of the compressed gas to a downstream side of the bearing housing thereby counteracting a pressure differential across the bearing housing.

27. The method of claim 26, which includes the further step of providing the shaft with a plurality of grooves.

28. A method of balancing pressure within a compressor housing, comprising:

providing annular grooves on an impeller;

using a shaft to rotate the impeller;

positioning a bearing housing around the outer circumference of the shaft and downstream from the impeller;

positioning a labyrinth seal downstream from the bearing housing with a seal gap relative to the shaft; and directing the aerodynamically resisted flow of the compressed gas to a downstream side of the bearing housing and through the seal gap thereby counteracting a pressure differential across the bearing housing.

29. The method of claim 28, wherein the plurality of annular grooves are on the downstream side of the impeller.

30. The method of claim 28, wherein the labyrinth seal comprises a plurality of discs.

31. The method of claim 30, wherein the plurality of discs comprises four discs.

32. A method of compressing a gas without causing bearing lubricant leak, comprising:

flowing a compressed gas into a compressor housing;

applying aerodynamic resistance to the compressed gas; and directing the compressed gas around a bearing to expose an upstream and a downstream side of the bearing to the compressed gas to preclude flow of the compressed gas through the bearing.

* * * * *